(No Model.)

H. & J. NELSON.
POTATO DIGGER.

No. 321,629. Patented July 7, 1885.

WITNESSES
Chas. Nida
C. Sedgwick

INVENTOR:
H. Nelson
J. Nelson
BY Munn & Co.
ATTORNEYS.

UNITED STATES PATENT OFFICE.

HANS NELSON AND JACOB NELSON, OF WAUPACA, WISCONSIN.

POTATO-DIGGER.

SPECIFICATION forming part of Letters Patent No. 321,629, dated July 7, 1885.

Application filed November 21, 1884. (No model.)

*To all whom it may concern:*

Be it known that we, HANS NELSON and JACOB NELSON, both of Waupaca, in the county of Waupaca and State of Wisconsin, have invented certain new and useful Improvements in Potato-Diggers, of which the following is a full, clear, and exact description.

Reference is to be had to the accompanying drawings, forming part of this specification, in which similar letters of reference indicate corresponding parts in all the figures.

Figure 1:
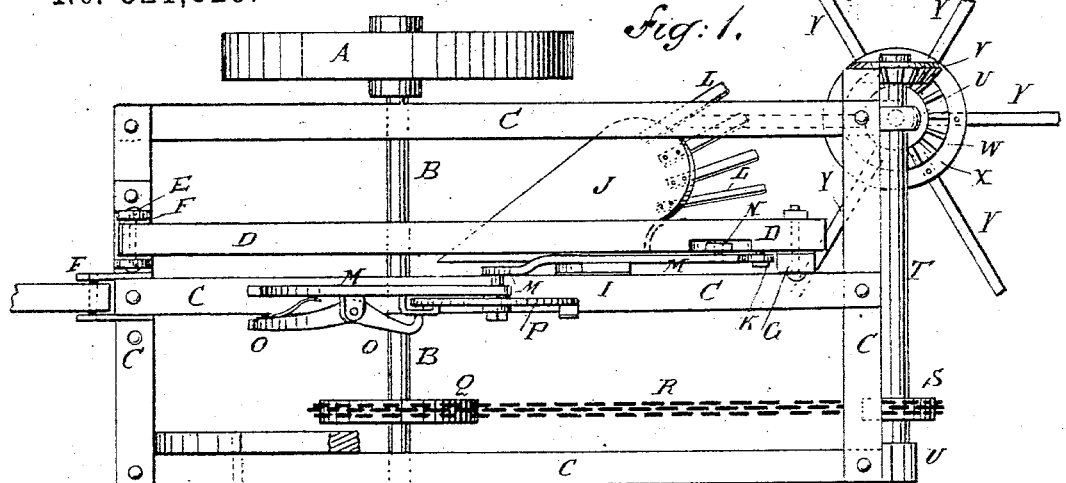
Figure 2:
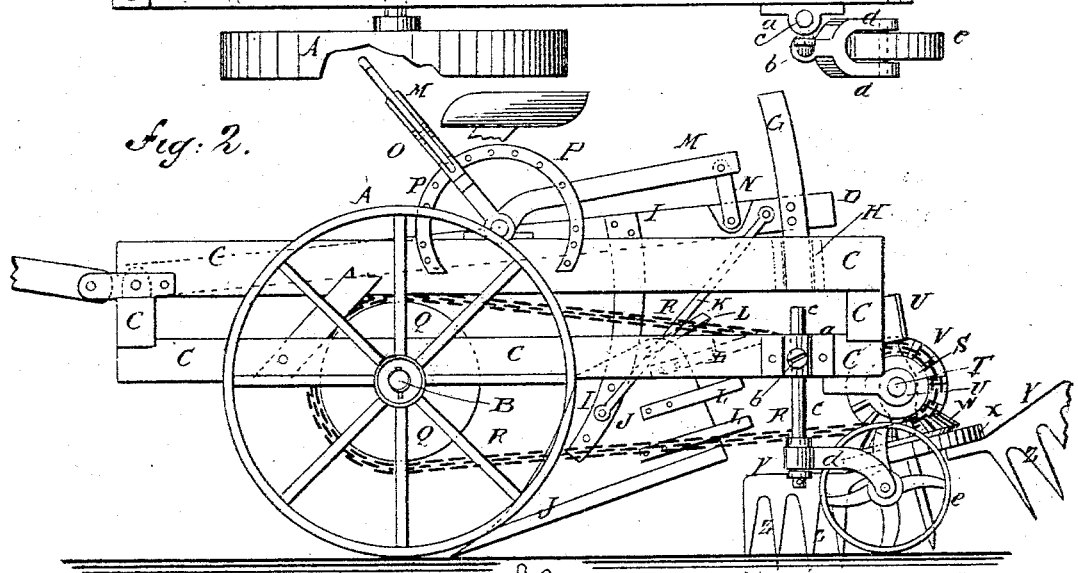
Figure 3:
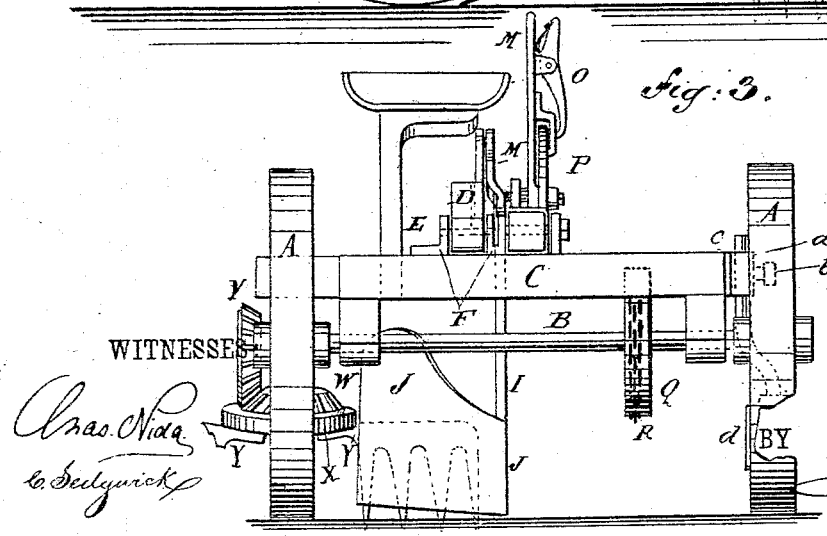

Figure 1 is a plan view of one of our improved potato-diggers, parts being broken away. Fig. 2 is a side elevation of the same, parts being broken away. Fig. 3 is a front elevation of the same, parts being broken away.

The object of this invention is to provide machines simple in construction, inexpensive in manufacture, and effective in operation for digging the potatoes and separating them from the soil.

The invention consists in the peculiar construction and arrangement of parts, as hereinafter fully described, and pointed out in the claims.

A represents the wheels of a potato-digger, the axle B of which revolves in bearings attached to the side bars of the frame C.

At the side of the central longitudinal bar of the frame C is placed the plow-beam D, the forward end of which is hinged by a bolt, E, to lugs F or other supports attached to the forward cross-bar of the frame C.

To the rear end of the plow-beam D is attached a curved bar, G, the lower part of which slides in a keeper, H, attached to the side of the central bar of the frame C, so that the said rear end of the plow-beam D can play up and down freely while being held from lateral movement.

To the plow-beam D, a little in the rear of its center, is attached the upper end of the standard I, to the lower end of which is attached the plow J. The standard I is strengthened against the resistance of the soil by the brace K, the lower end of which is attached to the lower part of the standard I, and its upper end is attached to the rear part of the beam D.

To the rear end of the mold-board of the plow J are attached bars or fingers L, through the spaces between which the soil of the furrow-slice passes, while the potatoes not small enough to pass through the said spaces drop to the ground.

M is a bent lever, the middle part of which is horizontal, and rocks in a bearing attached to the central bar of the frame C. The lower arm of the lever M extends rearward and upward, and its rear end is connected with the rear part of the plow-beam D by a short bar or link, N. The upper arm of the lever M projects upward and forward into such a position that it can be readily reached and operated by the driver from his seat to adjust the plow. The upper arm of the lever M is provided with a spring-lever pawl, O, to engage with an arched catch-bar, P, attached at its ends to the central bar of the frame C, to hold the lever M, and with it the plow-beam D and the plow J, securely in any position into which they may be adjusted.

To the axle B is attached a large chain-wheel, Q, around which passes an endless chain, R. The chain R also passes around a smaller chain-wheel, S, attached to a shaft, T, which revolves in bearings U, attached to the rear end of the frame C. To the end of the shaft T, at the mold-board side of the plow J, is attached a beveled gear-wheel, V, the teeth of which mesh into the teeth of the beveled gear-wheel W. The beveled gear-wheel W revolves upon a rearward inclined journal formed upon or attached to the bearing for the shaft T or other suitable support. With the beveled gear-wheel W is rigidly connected, or upon it is formed, a flange or wheel, X, to which are attached six (more or less) radial arms, Y. The parts of the arms Y that project beyond the rim of the flange or wheel X are inclined upward from the plane of the said flange or wheel at such an angle that the said arms will be horizontal while in front of the axis of the said wheel X, and will have an upward inclination when in the rear of the said axis, as shown in Fig. 2. Upon the outer parts of the arms Y are formed, or to them are attached, teeth Z, which, when the said arms Y are in a horizontal position, enter the soil to a sufficient depth to come in contact with any potatoes that may have been covered with soil, uncover them, and leave them upon the surface of the ground. When the arms Y are in the rearward part of their movement, the teeth Z will be above the surface of the ground. To the other rear corner of the frame C is attached a bearing, $a$, in which is secured, by a set-screw, $b$, or other suitable means, an upright, $c$, so that the said upright can be readily adjusted higher or lower, as may be required. To the lower end of the upright $c$ is swiveled the forward end of the standard $d$, the rear end of which is forked, and to it is pivoted the caster-wheel $e$, by which the rear end of the machine is carried.

Having thus described our invention, we claim as new and desire to secure by Letters Patent—

1. In a potato-digger, the combination, with a supporting-frame and a plow, of a wheel journaled in rear of the said plow, and provided with toothed arms projecting from the rim of the wheel and inclined upward from the plane of the said wheel, and means for revolving the wheel by the forward movement of the machine, substantially as herein shown and described.

2. In a potato-digger, the combination, with the wheel A, axle B, frame C, and plow J, of the shaft T, journaled in the rear part of the frame, the bevel gear-wheels V W, the wheel X, arranged in rear of the plow, and provided with the toothed arms Y Z, projecting upwardly from the plane of the wheel and intermediate mechanism for operating the said shaft from the axle, substantially as herein shown and described.

3. A potato-digger consisting of a frame mounted on wheels, a plow-beam hinged to the forward end of the frame, a plow on the beam, and a revolving rake at one corner of the frame, in rear of and at the mold-board side of the plow, the teeth of the rake being adapted to come in contact with the ground in front of the axis of its head, substantially as herein shown and described.

HANS NELSON.
JACOB NELSON.

Witnesses:
O. H. ROWE,
A. V. BEADLESTON.